Patented May 15, 1951

2,552,577

UNITED STATES PATENT OFFICE 2,552,577

DIAMIDOTHIOPHOSPHATES

Clarence L. Moyle, Clare, Mich., assignor to The Dow Chemical Company, Midland, Mich., a corporation of Delaware No Drawing. Application October 15, 1948, Serial No. 54,830

6 Claims. (Cl. 260—461)

This invention is directed to diamidothiophosphates having the formula

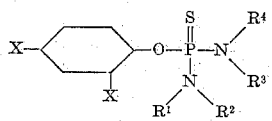

wherein one of the symbols $R^1$, $R^2$, $R^3$, and $R^4$ represents an alkyl or cycloalkyl radical, and the remaining R symbols represent hydrogen, cycloalkyl or an alkyl radical, one X represents a nitro radical and the other X represents hydrogen.

These diamidothiophosphates are oils or crystalline solids, somewhat soluble in many organic solvents, substantially insoluble in water, stable to light and air and non-corrosive to the skin of man and higher animals. The new products are particularly valuable as constituents of insecticide compositions. They may also be employed as constituents of extreme pressure lubricants, as intermediates in the preparation of more complex organic derivatives and as modifiers in plastic compositions.

The new diamidothiophosphate products may be prepared by reacting an N-alkyl or cycloalkyl dichlorothiophosphoramide having the formula

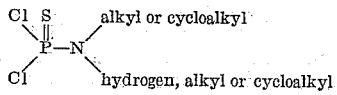

with an alkali metal nitrophenolate and thereafter with ammonia or an alkyl or cycloalkyl amine.

In the initial phase of the reaction, a solution of the nitrophenolate is prepared by reacting an alkali metal with the nitrophenol in an inert organic solvent and conveniently in ethyl alcohol. For example, 1 molecular proportion of sodium is reacted with 1 molecular proportion of the nitrophenolate in ethyl alcohol. The resulting phenolate dispersion is then added portionwise to 1 molecular proportion of the N-substituted dichlorothiophosphoramide dispersed in the same solvent. The reaction is exothermic and has been found to take place at a temperature of from 30° to 110° C. Temperature control is maintained by regulation of the rate of addition of the nitrophenolate and by the addition and subtraction of heat, if required.

In the second phase of the reaction, the intermediate product as obtained above is cooled and 2 molecular proportions or more of ammonia or of an alkyl or cycloalkyl amine are added portionwise. The reaction is exothermic and takes place at a temperature between 30° and 110° C., the exact temperature depending somewhat upon the particular amine employed.

Following the reaction, the solvent is removed from the crude mixture by evaporation and the residue dispersed in a non-reactive water-immiscible organic solvent, such as methylene dichloride, carbon tetrachloride or benzene. The resultant mixture may be successively washed with dilute aqueous ammonium or sodium hydroxide and with water, and dried with anhydrous sodium sulphate. The separation of the product is then accomplished by evaporation of the solvent.

In an alternative method of preparation, thiophosphoryl chloride (PSCl₃) is successively reacted with a polyhalophenol and an alkyl or cycloalkyl amine.

The N-substituted dichlorothiophosphoramides employed as starting materials may be prepared by reacting a monoalkyl-, monocycloalkyl-, dialkyl-, dicycloalkyl- or alkyl cycloalkyl-amine with an excess of thiophosphoryl chloride. Satisfactory yields are obtained by employing from 1 to 4 molecular proportions of thiophosphoryl chloride per molecular proportion of amine salt. The reaction takes place at a temperature of from 10° to 80° C. Following the reaction, the mixture is filtered and the filtrate fractionally distilled under reduced pressure to obtain the N-substituted dichlorothiophosphoramide.

The following examples illustrate the invention but are not to be construed as limiting the same.

*Example 1.— O-4-nitrophenyl-N-ethyldiamidothiophosphate*

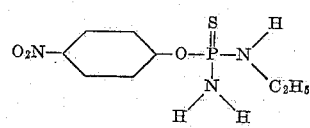

1.15 grams (0.05 mol) of sodium was reacted with 6.95 grams (0.05 mol) of 4-nitrophenol in 39 grams of ethyl alcohol to form an alcoholic solution of the phenolate. This product was added portionwise over a period of 5 minutes with stirring to 8.9 grams (0.05 mol) of N-ethyl dichlorothiophosphoramide dispersed in 20 grams of ethyl alcohol. During the addition, the temperature rose to 60° C. Stirring was continued thereafter for 5 minutes at this temperature, and the mixture then cooled to room temperature. A molecular excess of gaseous ammonia was added portionwise over a period of 8 minutes to the above intermediate product. The addition was carried out at a temperature of from 22° to 30° C. The ethyl alcohol was then removed by evaporation and the residue dispersed in methylene dichloride. This solvent mixture was successively washed with dilute aqueous ammonium hydroxide and water, and dried with anhydrous sodium sulphate. The methylene dichloride was then removed by evaporation to obtain an O-4-nitrophenyl N-ethyldiamidothiophosphate product. The latter was a brown oil having a density of 1.15 at 24° C. and a refractive index $n/D$ of 1.5039 at 35° C.

*Example 2.—O-4-nitrophenyl N,N-dimethyl-diamidothiophosphate*

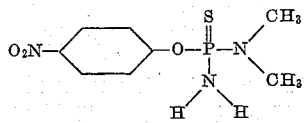

2.3 grams (0.1 mol) of sodium was reacted with 13.9 grams (0.1 mol) of 4-nitrophenol in 78.9 grams of ethyl alcohol to form the sodium salt of the phenol. This product was added portionwise over a period of 5 minutes to 17.8 grams (0.1 mol) of N,N-dimethyl dichlorothiophosphoramide. The addition was carried out at a temperature of 50° to 55° C., and the resulting mixture subsequently warmed for 5 minutes at 65° C. The reaction vessel and contents were cooled to 22° C., and a molecular excess of gaseous ammonia added portionwise over a period of 8 minutes. During the addition, the temperature rose to 29° C. The separation was carried out as described in Example 1 to obtain an O-4-nitrophenyl N,N - dimethyldiamidothiophosphate product. The latter was an orange oil having a density of 1.27 at 24° C. and a refractive index $n/D$ of 1.5679 at 35° C.

*Example 3.—O-4-nitrophenyl N,N,N'-trimethyl-diamidothiophosphate*

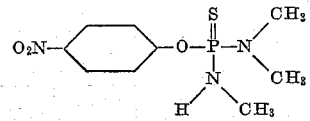

2.3 grams (0.1 mol) of sodium and 13.9 grams (0.1 mol) of 4-nitrophenol were reacted in 78.9 grams of ethyl alcohol. This alcoholic phenolate was added portionwise over a period of 5 minutes to 17.8 grams (0.1 mol) of N,N-dimethyl dichlorothiophosphoramide dispersed in 20 grams of ethyl alcohol. The temperature was maintained at 50° to 55° C. during the addition. The reactor and contents were then warmed for 5 minutes at 65° C. and cooled to room temperature. 9.3 grams (0.3 mol) of methylamine was added portionwise over a period of 10 minutes to the above intermediate product. During the addition, the temperature rose to 47° C. About one-half of the ethyl alcohol was then removed by evaporation and the residue dispersed in methylene dichloride. This solvent mixture was successively washed with dilute aqueous ammonium hydroxide and water, and dried with anhydrous sodium sulphate. The solvent was then removed by evaporation to obtain an O-4-nitrophenyl N,N,N' - trimethyldiamidothiophosphate product as a low melting solid having a density of 1.25 at 24° C. and a refractive index $n/D$ of 1.5667 at 35° C.

*Example 4.—O-4-nitrophenyl N-ethyl-N'-methyldiamidothiophosphate*

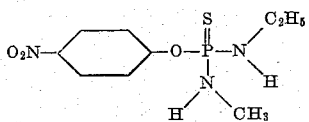

1.01 grams (0.045 mol) of sodium and 6.3 grams 0.045 mol) of 4-nitrophenol were reacted together in ethyl alcohol. This product was added portionwise over a period of 10 minutes to 8 grams (0.045 mol) of N-ethyl dichlorothiophosphoramide dispersed in ethyl alcohol. The temperature rose to 45° C. during the addition and was thereafter brought to 60° C. for 5 minutes. 5.5 grams (0.178 mol) of methylamine was added portionwise over a period of 5 minutes and at a reaction temperature of 50° to 55° C. The resulting mixture was then warmed for 5 minutes at 50° C. to complete the reaction. The crude mixture was washed with a saturated aqueous solution of sodium chloride and the organic products of reaction extracted with benzene. This mixture was successively washed with dilute aqueous ammonium hydroxide and water and dried with anhydrous sodium sulphate. The solvent was then removed by evaporation to obtain an O-4-nitrophenyl N-ethyl-N'-methyldiamidothiophosphate product. The latter was a brown oil having a density of 1.01 at 23° C. and a refractive index $n/D$ of 1.5000 at 35° C.

*Example 5.—O-4-nitrophenyl N-isopropyl-N'-methyldiamidothiophosphate*

1.85 grams (0.08 mol) of sodium and 11.1 grams (0.08 mol) of 4-nitrophenol were reacted in ethyl alcohol and this alcoholic phenolate dispersion added portionwise over 5 minutes to 15.4 grams (0.08 mol) of N-isopropyl dichlorothiophosphoramide dispersed in ethyl alcohol. The temperature was regulated at 40° to 45° C. during the addition and the mixture subsequently warmed for 5 minutes at 55° C. The vessel and contents were cooled to 40° C. and 10.8 grams (0.35 mol) of methylamine added portionwise over a period of 5 minutes. The temperature rose to 70° C. during the addition, and was subsequently brought to 60° to 70° C. for 15 minutes to complete the reaction. About one-eighth of the ethyl alcohol was removed by evaporation. The crude residue was washed with water and the organic products of reaction extracted with benzene. The separation was carried out as described in Example 4 to obtain an O-4-nitrophenyl N-isopropyl-N'-methyldiamidothiophosphate product as a brown oil having a density of 1.07 at 25° C. and a refractive index $n/D$ of 1.5824 at 35° C.

*Example 6.—O-4-nitrophenyl N-cyclohexyl-N',N'-dimethyldiamidothiophosphate*

1.15 grams (0.05 mol) of sodium and 6.95 grams (0.05 mol) of 4-nitrophenol were reacted in methyl alcohol. This product was added portionwise to 8.95 grams (0.05 mol) of N,N-dimethyl dichlorothiophosphoramide and the resulting mixture warmed for 5 minutes at 60° C. The vessel and contents were cooled to room temperature, and 9.9 grams (0.1 mol) of cyclohexylamine added portionwise. The reaction mixture was then warmed for 10 minutes at 55° to 60° C. to complete the reaction. The methyl alcohol was removed by evaporation and the residue dispersed in methylene dichloride. This mixture was successively washed with dilute aqueous hydrochloric acid, dilute aqueous ammonium hydroxide and water, and dried with anhydrous sodium sulphate. The methylene dichloride was then removed by evaporation to obtain an O-4-nitrophenyl N-cyclohexyl - N',N' - dimethyldiamidothiophosphate product as a brown oil having a density of 1.10 at 25° C. and a refractive index $n/D$ of 1.5441 at 35° C.

*Example 7.—O-2-nitrophenyl N-normaldodecyl-N'-ethyldiamidothiophosphate*

1.38 grams (0.06 mol) of sodium was reacted with 8.34 grams 0.06 mol of 2-nitrophenol in methyl alcohol and the resulting phenolate solution added portionwise over a period of 3 minutes to 10.7 grams (0.06 mol) of N-ethyl dichlorothiophosphoramide. The temperature was regulated at 40° to 45° C. during the addition and subsequently raised to 50° to 55° C. for 5 minutes. 22.3 grams (1.2 mol) of normaldodecyl amine was added portionwise over a period of 4 minutes with cooling to 35° to 45° C. The mixture was then warmed for 5 minutes at 45° to 50° C. to complete the reaction. The methyl alcohol was removed by evaporation and the residue dispersed in methylene dichloride. This solvent solution of the reaction product was washed with dilute aqueous hydrochloric acid. An emulsion formed and was broken by the addition of a small amount of acetone. The mixture divided into aqueous and solvent layers. The latter was separated, washed successively with dilute aqueous ammonium hydroxide and water, and dried with anhydrous sodium sulphate. The methylene dichloride was then removed by evaporation to obtain an O-2-nitrophenyl N-normaldodecyl-N'-ethyldiamidothiophosphate product as a dark brown oil having a density of 1.03 at 30° C. and a refractive index $n/D$ of 1.4862 at 35° C.

*Example 8.—O-4-nitrophenyl N-cyclohexyldiamidothiophosphate*

33.9 grams (0.2 mol) of thiophosphoryl chloride was dissolved in 100 milliliters of diethyl ether. 39.6 grams (0.4 mol) of cyclohexyl amine dissolved in 100 milliliters of diethyl ether was added portionwise to the above solution over a period of 5 minutes and the resulting mixture thereafter warmed at the boiling temperature for 5 minutes. The crude reaction mixture was then filtered and the filtrate concentrated by evaporation to a volume of 250 milliliters. An alcoholic phenolate solution prepared by reacting 1.38 grams (0.06 mol) of sodium with 8.35 grams (0.06 mol) of 4-nitrophenol in methyl alcohol was then added portionwise to one-third of the above prepared concentrate. The resulting mixture was warmed for 5 minutes at the boiling temperature and under reflux and thereafter cooled to room temperature. A molecular excess of gaseous ammonia was then added portionwise to this intermediate product. The methyl alcohol and diethyl ether were then removed from the crude reaction mixture by evaporation and the residue dispersed in methylene dichloride. This solvent solution was successively washed with dilute aqueous ammonium hydroxide, dilute aqueous hydrochloric acid and water, and dried with anhydrous sodium sulphate. The methylene dichloride was then removed by evaporation to obtain an O-4-nitrophenyl N-cyclohexyldiamidothiophosphate product as a crystalline solid melting at 81° to 83° C.

*Example 9*

1.61 grams (0.07 mol) of sodium was reacted with 9.7 grams (0.07 mol) of 2-nitrophenol in ethyl alcohol. This alcoholic phenolate solution was added portionwise over a period of 7 minutes to 14.4 grams (0.07 mol) of N,N-diethyl dichlorothiophosphoramide dispersed in methyl alcohol and the resulting mixture warmed for 20 minutes at 69° C. The reactor and contents were cooled to 45° C., 25.5 grams (0.14 mol) of dicyclohexylamine added portionwise over 2 minutes and the resulting mixture warmed for 10 minutes at 50° to 55° C. to complete the reaction. The methyl and ethyl alcohol were then removed by evaporation and the residue dispersed in methylene dichloride. The separation was carried out as described in Example 6 to obtain an O-2-nitrophenyl N,N-dicyclohexyl - N',N'-diethyldiamidothiophosphate product as a dark orange oil having a density of 1.05 at 31° C. and a refractive index $n/D$ of 1.4926 at 36° C.

Further details on the preparation of the N - cyclohexyl dichlorothiophosphoramide employed as a starting material in Example 8 are set forth in a copending application, Serial No. 54,831, now abandoned, filed concurrently herewith. This compound is a white crystalline solid having a freezing point of 70° C. and a boiling point of 135° to 143° C. at 4 millimeters pressure.

In a similar manner other diamidothiophosphates may be prepared as follows:

O - 2 - nitrophenyl N-secondarybutyl-N'-isopropyl-N'-ethyldiamidothiophosphate by reacting sodium 2-nitrophenolate, N-secondarybutyl dichlorothiophosphoramide and N - isopropyl N-ethyl amine.

O-4-nitrophenyl N - normalhexyl-N'-normalhexyl-diamidothiophosphate by reacting sodium 4-nitrophenolate, N-normalhexyl dichlorothiophosphoramide and normalhexylamine.

O-4-nitrophenyl N-ethyl-N'-(2 - methylcyclohexyl) diamidothiophosphate by reacting sodium 4-nitrophenolate, N-ethyl dichlorothiophosphoramide and 2-methylcyclohexylamine.

O - 2 - nitrophenyl N,N-dinormalbutyl-N'-(4-phenylcyclohexyl) diamidothiophosphate by reacting sodium 2-nitrophenolate, N,N-dinormalbutyl dichlorothiophosphoramide and 4-phenylcyclohexylamine.

O-4-nitrophenyl N,N',N'-tricyclohexyldiamidothiophosphate by reacting sodium 4-nitrophenolate, N-cyclohexyl dichlorothiophosphoramide and dicyclohexylamine.

The new diamidothiophosphates have been found effective as insecticides and fungicides and are adapted to be employed for the control of a wide range of agricultural and household pests. They may be applied to growing vegetation in amounts required for insect control with negligible injury to plant foliage. For such insecticidal use, the products may be dispersed in a finely divided solid and employed as dusts. Also, such mixtures may be dispersed in water with the aid of a wetting agent and the resulting aqueous suspensions employed as sprays. In other procedures, the products may be employed in oils, as constituents of oil in water emulsions, or in water dispersions with or without the addition of wetting, dispersing or emulsifying agents.

The products of the preceding examples have been tested for the control of two-spotted spider mite, bean aphid, Mexican bean beetle and Southern army worm. In representative operations against such organisms, 100 per cent controls have been obtained with aqueous spray compositions containing from 0.25 to 2 pounds of the toxicant per 100 gallons of spray mixture. The products have also been tested for the control of American roach nymphs, milkweed bugs, confused flour beetle and black carpet beetle. Against such organisms, 100 per cent kills have been obtained in 48 hours by allowing the insects to feed upon white flour containing 1 per cent or less by weight of many of the new toxicants.

I claim:

1. A diamidothiophosphate having the formula

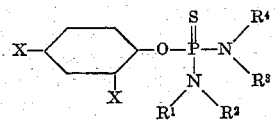

wherein one of the symbols $R^1$, $R^2$, $R^3$, and $R^4$ is selected from the group consisting of the alkyl and cycloalkyl radicals, and each remaining R symbol is selected from the group consisting of hydrogen, cycloalkyl and the alkyl radicals, one X represents a nitro radical and the other X represents hydrogen.

2. O-4-nitrophenyl N-ethyldiamidothiophosphate.

3. O-4-nitrophenyl N-ethyl-N'-methyldiamidothiophosphate.

4. O-4-nitrophenyl N-cyclohexyldiamidothiophosphate.

5. O-4-nitrophenyl N,N,N'-trimethyldiamidothiophosphate.

6. O-4-nitrophenyl N,N-dimethyldiamidothiophosphate.

CLARENCE L. MOYLE.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,172,241 | Dickey et al. | Sept. 5, 1939 |

FOREIGN PATENTS

| Number | Country | Date |
|---|---|---|
| 500,386 | Great Britain | Feb. 8, 1939 |

OTHER REFERENCES

Autenrieth et al.: "Ber. deutsch. chem. Ges.," vol. 31 (1898), pp. 1094–1100.

Strecker et al.: "Ber. deutsch. chem. Ges.," vol. 49 (1916), pp. 63–87.

FIAT Final Report 949 "Organic Chemical Intermediates for Insecticides, Fungicides and Rodenticides" by Thurston. OTS publication No. PB–60890, released May 30, 1947. Pages 19–20.